(No Model.) 2 Sheets—Sheet 1.
R. SPROUL.
SHAFT ATTACHMENT FOR VEHICLES.
No. 393,791. Patented Dec. 4, 1888.
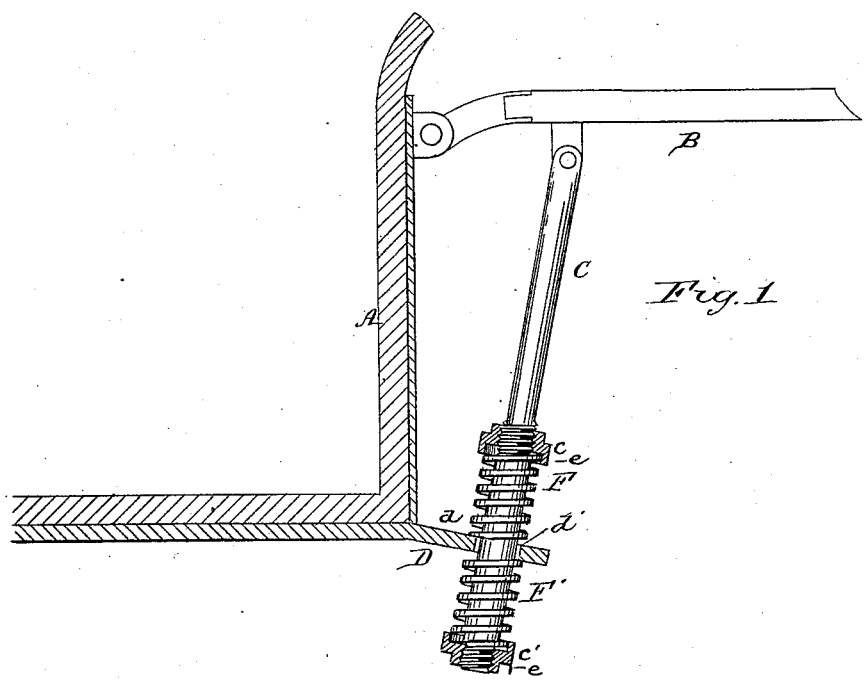
WITNESSES:
N. C. Evert,
A. B. Blackwood.
INVENTOR,
Robert Sproul.
BY Connsey Bro
ATTORNEYS.

(No Model.) 2 Sheets—Sheet 2.
R. SPROUL.
SHAFT ATTACHMENT FOR VEHICLES.
No. 393,791. Patented Dec. 4, 1888.
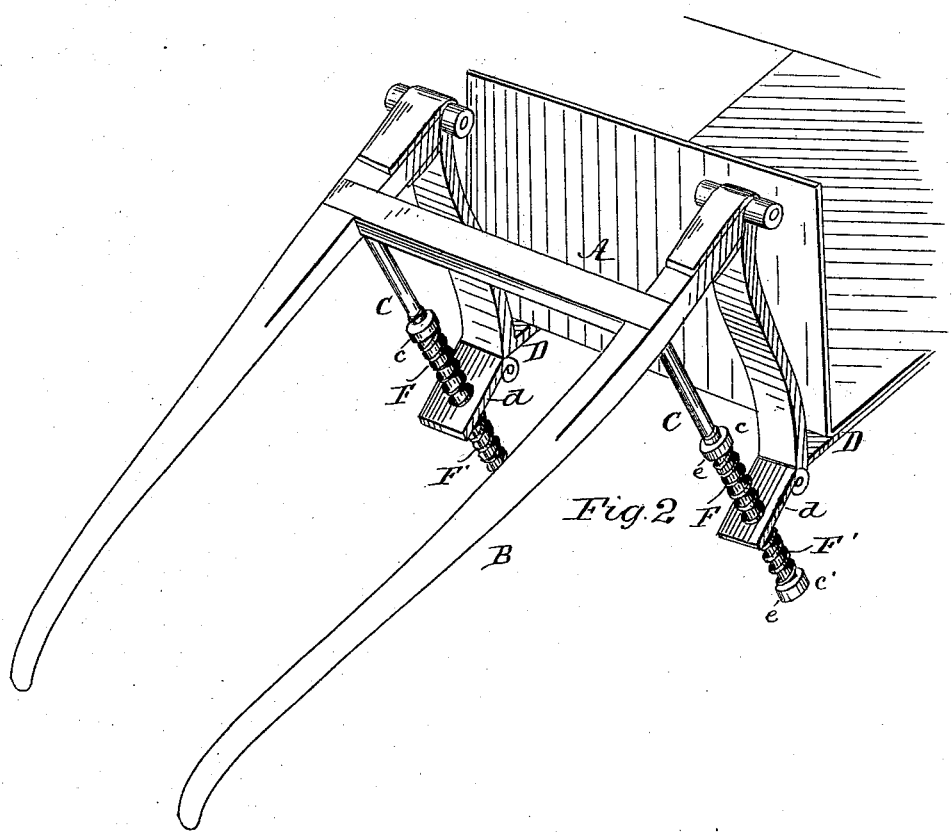
WITNESSES:
H. C. Evert.
A. B. Blackwood.
INVENTOR,
Robert Sproul,
BY Connell Bros
ATTORNEYS.

UNITED STATES PATENT OFFICE.

ROBERT SPROUL, OF PITTSBURG, PENNSYLVANIA.

SHAFT ATTACHMENT FOR VEHICLES.

SPECIFICATION forming part of Letters Patent No. 393,791, dated December 4, 1888.

Application filed February 18, 1888. Serial No. 264,468. (No model.)

*To all whom it may concern:*

Be it known that I, ROBERT SPROUL, a citizen of the United States, residing at Pittsburg, in the county of Allegheny and State of Pennsylvania, have invented certain new and useful Improvements in Shaft Attachments for Vehicles; and I do hereby declare the following to be a full, clear, and exact description of the invention, reference being had to the accompanying drawings, which form part of this specification.

This invention has relation to vehicles of the class shown and described in Letters Patent of the United States granted May 17, 1887, No. 363,230, to Robert W. Hare and Robert Sproul—that is to say, to two-wheeled vehicles, such as cabs, road-carts, and the like. The improvements embodied in said Letters Patent have reference to devices for relieving the vehicle of the jolting and jarring known as "horse motion," which always occurs in two-wheeled vehicles when the shafts are rigidly attached to the body thereof. The expedients shown and described in said Letters Patent consist of spring-braces pivotally attached to the shafts and to the front plate of the vehicle, the shafts being hinged or pivoted also to the front of the vehicle. The spring portions of the braces in said patent are inclosed in cylindrical boxes or casings, while the brace-rods play through holes in caps on the upper ends of the casings and are provided with collars or heads which bear upon or against the springs, one spring in each casing being above and the other below said collar.

The object of the present invention is to provide a construction and arrangement of braces, whereby the casings shown in said patent may be dispensed with and a simpler and less expensive mechanism than that embraced in that patent employed.

The invention consists in the novel construction and combination of devices, hereinafter described and claimed.

In the drawings, Figure 1 is a vertical central sectional view of the improved spring-brace applied to the shafts and body of the vehicle. Fig. 2 is a front perspective view of so much of the vehicle and attachments as are necessary to illustrate the nature of the brace.

For the purpose of illustration, it will suffice to show and describe my improvements as applied to a two-wheeled buggy or gig, but it may be applied to cabs or any other form of vehicle adapted to receive it.

A designates the front of the vehicle, if a cab, and B B the shafts pivotally attached to the same or to a plate or plates fastened thereon, or, if desired, to plates, standards, or supports rising from the base or bottom of the vehicle at the sides, as shown in Letters Patent of the United States granted to Hare and Sproul, No. 363,230.

C designates the brace-rods pivotally or otherwise attached at their upper ends to the shafts or to the cross-bar uniting the latter.

D designates plates secured to the bottom of the vehicle on either side and projecting forward beyond the vertical plane of the vehicle-front or of the dash-board, where they are bent or curved downwardly, so as to be approximately at right angles to the axis of the brace-rods, which latter when in position are placed obliquely, so as to lie at an acute angle with the shafts, substantially as shown in said Letters Patent No. 363,230. The depending or downwardly-bent portions $d$ of the plates D are pierced at $d'$ for the passage of the brace-rods.

F F' designate the springs, which, instead of being fitted within boxes or casings, are arranged upon the rods C, one spring, F', on either side being placed below and the other above the plate D, in which position their inner ends abut against said plates instead of against the collar on the brace-rod, as shown in said Patent No. 363,230.

The rods C are enlarged slightly at their lower portions, where they pass through the springs, and threads are cut on the enlarged portions for the reception of the nuts $c\ c'$, having annular flanges $e\ e$, which embrace the outer ends of the springs.

The parts being as shown and described, the irregular downward motion or "dip" of the vehicle in one direction is taken up by the lower springs, F, while the upward motion is taken up by the springs F'. So, too, the downward movement or thrust of the shafts is received by the springs F' and the upper movement by the springs F.

The nuts $c\ c'$ are adjustable so that the tension of the spring may be properly regulated.

If desired, the parts $d$ may be separate from the plate D and hinged thereto.

Having described my invention, what I claim, and desire to secure by Letters Patent, is—

1. In a two-wheeled vehicle, the combination, with the front panel or dash-board and the shafts B B, pivotally attached to said dash-board, of the bottom plate, D, having the pierced extensions $d$ $d$, and the oblique brace-rods C, pivoted to said shafts and passing through said extensions, the spiral springs F F', encircling said rods and located, respectively, above and below the plates D D, and the nuts $c$ $c'$, fitted to said rods at the extremities of the said springs, substantially as described.

2. In shaft attachments for two-wheeled vehicles, the combination, with the brace-rods C C and springs F F', of the nuts $c$ $c$, having annular flanges which embrace said springs, substantially as described.

In testimony that I claim the foregoing I have hereunto set my hand this 14th day of February, 1888.

ROBERT SPROUL.

Witnesses:
H. C. EVERT,
FRANK CARLIER.